(12) United States Patent
    Yang et al.

(10) Patent No.: US 10,534,634 B2
(45) Date of Patent: Jan. 14, 2020

(54) EFFICIENT, TIME-BASED LEADER NODE ELECTION IN A DISTRIBUTED COMPUTING SYSTEM

(71) Applicant: Alibaba Group Holding Limited, George Town (KY)

(72) Inventors: Zhenkun Yang, Hangzhou (CN); Jinliang Xiao, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 32 days.

(21) Appl. No.: 15/719,125

(22) Filed: Sep. 28, 2017

(65) Prior Publication Data
    US 2018/0018198 A1    Jan. 18, 2018

Related U.S. Application Data

(63) Continuation of application No. PCT/CN2016/076414, filed on Mar. 15, 2016.

(30) Foreign Application Priority Data

Apr. 2, 2015    (CN) .......................... 2015 1 0155909

(51) Int. Cl.
    *G06F 9/48*      (2006.01)
    *H04L 12/24*    (2006.01)
    *H04L 9/32*     (2006.01)
    *G06F 1/12*     (2006.01)

(52) U.S. Cl.
    CPC ................................. *G06F 9/4806* (2013.01)

(58) Field of Classification Search
    USPC ......................................................... 709/203
    See application file for complete search history.

(56) References Cited

U.S. PATENT DOCUMENTS 6,321,086 B1 * 11/2001 Thurston ................ G06Q 50/32
                                                    455/433
7,139,790 B1    11/2006 Wang et al.
7,296,269 B2    11/2007 Lin
                    (Continued)

FOREIGN PATENT DOCUMENTS

CN        101252603       8/2008
CN        101771488       7/2010
                    (Continued)

OTHER PUBLICATIONS

International Search Report by the International Searching Authority issued in International Application No. PCT/CN2016/076414 dated Jun. 22, 2016; 9 pages.
(Continued)

*Primary Examiner* — Jude Jean Gilles
(74) *Attorney, Agent, or Firm* — Fish & Richardson P.C.

(57) ABSTRACT

A same voting time, a same vote counting time, and a same leader node tenure is configured by a host for all nodes. Time configuration information including the same configured voting time, the same vote counting time, and the same leader node tenure, is sent to all the nodes. The nodes are operable to vote during the same voting time, count the number of votes during the same vote counting time, and elect a leader node according to a vote counting result. The nodes are enabled to perform periodic node election according to the same leader node tenure.

20 Claims, 9 Drawing Sheets

*100*

CONFIGURE A SAME VOTING TIME, A SAME VOTE COUNTING TIME, AND A SAME LEADER NODE TENURE FOR ALL NODES ⟋101

SEND TIME CONFIGURATION INFORMATION THAT INCLUDES THE CONFIGURED VOTING TIME, VOTE COUNTING TIME, AND LEADER NODE TENURE TO ALL THE NODES, SO THAT THE NODES VOTE DURING THE VOTING TIME, COUNT THE NUMBER OF VOTES DURING THE VOTE COUNTING TIME, AND ELECT A LEADER NODE ACCORDING TO A VOTE COUNTING RESULT, AND THE NODES ARE ENABLED TO PERFORM PERIODIC NODE ELECTION ACCORDING TO THE LEADER NODE TENURE ⟋102

(56) References Cited

U.S. PATENT DOCUMENTS

| | | | | |
|---|---|---|---|---|
| 9,185,003 | B1* | 11/2015 | Allen | H04L 43/0817 |
| 9,261,898 | B1* | 2/2016 | Allen | G06F 1/10 |
| 10,284,247 | B2* | 5/2019 | Deb | H04L 12/40013 |
| 2003/0046144 | A1* | 3/2003 | Clark | G06Q 50/34 |
| | | | | 705/12 |
| 2005/0132154 | A1* | 6/2005 | Rao | H04L 67/1097 |
| | | | | 711/162 |
| 2005/0283644 | A1 | 12/2005 | Lorch et al. | |
| 2007/0225933 | A1* | 9/2007 | Shimomura | G06K 9/00791 |
| | | | | 702/127 |
| 2008/0071853 | A1 | 3/2008 | Mosier et al. | |
| 2009/0239205 | A1* | 9/2009 | Morgia | G06Q 10/10 |
| | | | | 434/362 |
| 2009/0274050 | A1 | 11/2009 | Johansson et al. | |
| 2010/0145774 | A1* | 6/2010 | Veshnyakov | G07C 13/00 |
| | | | | 705/12 |
| 2017/0308612 | A1* | 10/2017 | Salehkaleybar | H04L 45/46 |

FOREIGN PATENT DOCUMENTS

| | | |
|---|---|---|
| CN | 102682572 | 9/2012 |
| CN | 103401947 | 11/2013 |
| CN | 103634375 | 3/2014 |
| CN | 104301971 | 1/2015 |
| CN | 104933132 | 9/2015 |
| CN | 106412124 | 2/2017 |
| TW | 201424305 | 6/2014 |

OTHER PUBLICATIONS

Cszhouwei, "The Raft Consensus Algorithm", blog.csdn.net/cszhouwei/article/details/38374603, Aug. 4, 2014, p. 1 to p. 4; 9 pages.
Search Report and Written Opinion by the Intellectual Property Office of Singapore issued in Singapore Application No. 11201708022Y dated Jul. 9, 2018; 8 pages.
Vasudevan S. et al., Leader Election Algorithms for Wireless Ad Hoc Networks. Proceedings of the DARPA Information Survivability Conference and Exposition, Apr. 22-24, 2003, Washington, DC, Apr. 24, 2003, pp. 261-272, Figs. 1, 4, Sections 1, 5.
Ongaro D. et al., In Search of an Understandable Consensus Algorithm. The Proceedings of USENIX ATC'14: 2014 USENIX Annual Technical Conference, Jun. 19-20, 2014, Philadelphia, PA, Jun. 20, 2014, pp. 305-319 Figs. 4-5, Section 5.
European Extended Search Report in European Application No. 16771251.2, dated Nov. 19, 2018, 9 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

\* cited by examiner

EFFICIENT, TIME-BASED LEADER NODE ELECTION IN A DISTRIBUTED COMPUTING SYSTEM

This application is a continuation of PCT Application No. PCT/CN2016/076414, filed on Mar. 15, 2016, which claims priority to Chinese Patent Application No. 201510155909.9, filed on Apr. 2, 2015, the entire contents of each which are hereby incorporated by reference.

TECHNICAL FIELD

The present application relates to the field of distributed computer systems, and in particular, to a time-based node election.

BACKGROUND

With the development of information technologies, the Internet can provide a large amount of diversified information for users. For network service providers, distributed systems are often required to process large amounts of data, because conventional processing devices, such as a single server, processor, or database, are incapable of satisfying necessary computational requirements for data processing.

Generally, multiple processing devices included in a distributed system may globally perform multiple types of management operations on various data resources in the distributed system, such as scheduling, distributed processing, cooperative processing, and remote control. Each processing device in the distributed system may be regarded as a distributed node (or "node"). In this way, data can be distributed to each node in the system for processing to improve data processing efficiency and increase data throughput.

In the distributed system, it is necessary to uniformly store some special types of information in a node to further improve efficiency of scheduling data resources in different nodes. For example, metadata describing data resources can include a storage location of data, an update state, a search keyword, and other information consistent with the present disclosure.

In order to provide continuous and reliable read and write service with unreliable but often cost-effective components, data replication is often widely used. In order to prevent corruption by multiple modifiers of the same data, a single leader is often elected from the corresponding replicas. This single leader acts as the representative of the corresponding replicas and does all reads and writes on behalf of them. In order to prevent long-time interruptions of the service, the leader has a tenure. In order to provide smooth and continuous service, the leader will renew its tenure by obtaining permission from a majority of the corresponding replicas before the expiration of its current tenure. If a majority of the replicas are active, the leader will always extend its tenure successfully unless the leader encounters some error (such as a network error, a software error, or a hardware error) or if the leader receives an abdication command from a human or non-human administrator.

Automatically electing a leader from a group of members without any intervention of human being is not easy, as no member is absolutely reliable and no member can act as an election coordinator. Besides, when a member cannot communicate with a leader, the leader may still work correctly.

Previous solutions for electing a leader can be as follows. When a member finds that the tenure of the current leader expires and the member receives no declaration from a new leader, the member will launch a new round of leader election by sending an election message to all other members. If the other members receive the election message and also find that the tenure of the current leader has expired, the other members will vote for the initiator, and the initiator will become the new leader. But if two or more members initiate the election simultaneously, the election will often fail. In this scenario, a determination of who will become the new leader is unknown and there is no way to set different election priorities among members.

SUMMARY

The present disclosure describes an efficient time-based node election in a distributed computing system.

A same voting time, a same vote counting time, and a same leader node tenure is configured by a host for all nodes. Time configuration information including the same configured voting time, the same vote counting time, and the same leader node tenure, is sent to all the nodes. The nodes are operable to vote during the same voting time, count the number of votes during the same vote counting time, and elect a leader node according to a vote counting result. The nodes are enabled to perform periodic node election according to the same leader node tenure.

In a particular implementation, a computer-implemented method comprises: configuring, by a host, a same voting time, a same vote counting time, and a same leader node tenure for all nodes; and sending time configuration information that includes the same configured voting time, the same vote counting time, and the same leader node tenure to all the nodes, the nodes operable to vote during the same voting time, count the number of votes during the same vote counting time, and elect a leader node according to a vote counting result, wherein the nodes are enabled to perform periodic node election according to the same leader node tenure.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, nodes can synchronously perform a voting operation and a vote counting operation according to a similar voting time and vote counting time configured by a host. Each node can vote and can receive ballots from other nodes. Each node can be a campaign note. In existing election techniques, the first voter who launches the election is often elected as a leader unless the voter launches a false election, for example, if the voter is isolated from the network. Second, identifying voting times and vote counting times can be advantageous over systems in which the timing of each node for voting and vote counting is uncertain. Third, the efficiency of determining a leader node in a node election process can be improved. Fourth, having a single leader node can improve retrieval, allocation, and processing efficiency of specified services. Fifth, electing a single leader node can also avoid service conflicts caused by competition between multiple leader nodes for processing specified services. Sixth, the use of a deterministic election method can assure that a leader must be elected if a majority of the voters are active and can communicate with each other. For example, this is different from previous election techniques that may fail to elect a leader if two or more voters launches the election simultaneously. Priorities can be set to voters, and active voters with highest priority can be elected. Other advantages will be apparent to those of ordinary skill in the art.

The details of one or more implementations of the subject matter of this specification are set forth in the Detailed Description, the claims, and the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
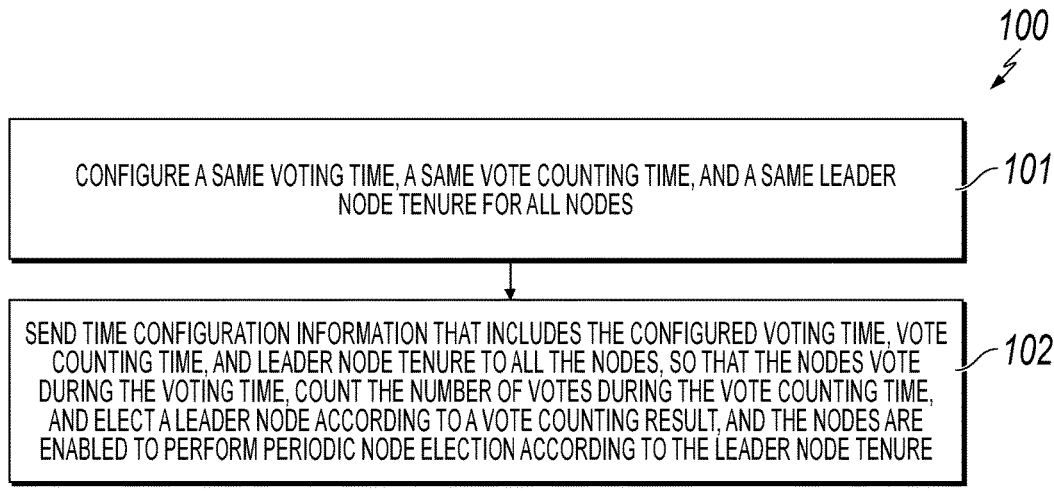
FIG. 1 is a flowchart illustrating an example of a method for a time-based node election of a leader node in a distributed system, according to an implementation of the present disclosure.

The following detailed description describes an efficient, time-based node election in a distributed computing system, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined may be applied to other implementations and applications, without departing from the scope of the present disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In order to achieve a deterministic election result, a periodically checking-and-electing technique can be used. Assume a cycle is 10 seconds, which can be the tenure of an elected leader node. Once every 10 seconds, each member can check the status of the leader node and perform the following steps. First, if the member determines that the tenure of the current leader has expired, then the member can send a leader-failure notification message with its ID and priority as well as other needed information to all other members. Second, if the member determines that the tenure of the current leader has expired, then the member can vote for the member with the highest priority among those received in the first step. Third, if the member determines that the tenure of the current leader has expired, then the member can check the ballots that the member has received in the second step, and the member can declare itself the new leader if the member has received ballots from a majority of members. Fourth, the member can clear all messages received in the previous steps.

Each processing device in a distributed system may be regarded as a distributed node (or "node"). A distributed system with plural nodes can include a leader node that is responsible for providing specified services, such as maintaining and managing metadata in the distributed system. Leader nodes can be elected from the plural nodes using a voting process that includes vote information provided by one or more of the plural nodes. Once elected, the leader node can perform specified services assigned to the leader node.

The distributed system can also include a host that can be, for example, a server in the distributed system. In some implementations, the host can be configured to manage nodes in the distributed system. Managing nodes can include, for example, scheduling data, configuring data, sending specific instructions, and other operations consistent with the present disclosure. Hosts can include, but are not limited to, network devices with a monitoring function, such as a server, processor, database.

In existing systems, a suitable node (or "leader node") can be selected by means of a node election, to maintain and manage metadata. In some implementations, a node can be elected in the following manner: different nodes may send voting requests to other nodes, and each node may vote after receiving a voting request. Finally, a leader node is elected according to the number of votes counted. For example, in replicated database systems, a leader (also called a "primary," such as of a database, a table, or a partition) is usually the representative of the corresponding database, table, or partition and offers all read and write services to its clients on behalf of the corresponding replicas.

However, during an election, nodes may be busy processing data and therefore incapable of immediately entering a voting state. Therefore, timing of each node for voting and counting can be uncertain. For example, when nodes in a conventional distributed system perform a node election, different nodes may send voting requests at different times, and respective timing for responding to the voting requests can be uncertain or random. However, using implementations of the present disclosure, a host in the distributed system can perform a time configuration on the nodes in the distributed system, enabling the nodes to perform the same type of processing operation(s) at the same time. To mitigate this problem, during an election of a leader node, the host can configure the same voting time and the same vote counting time for different nodes. The host can also configure a leader node tenure applicable to all nodes. Accordingly, after a node is elected as a leader node and the configured tenure expires, a new node election process can be started. Theoretically, any node can be elected as the leader, including a former leader. A practical system can always expect a stable leader. A leader will typically launch a new election round prior to the expiration of its tenure. An exception can occur, for example, if the leader determines that it is not suitable to continue its tenure due to some internal reason (for example, an error occurs) or for some external reason (for example, an administrator sends the leader an abdication command).

In some implementations, the voting time and the vote counting time can each be a time interval (rather than a point in time at a particular moment). Example types of lengths (or durations) of the time intervals of the voting time and the vote counting time can include (but are not limited to) durations formed by time units, such as milliseconds (ms), seconds, minutes, hours, days, weeks, months, or other time units. In the present disclosure, operations, such as voting, when described as occurring "during" a specified time (or a time period or a time interval) typically indicate a subset of the specified time, but can also refer to the entire specified time (as a time period or a time interval).

FIG. 1 is a flowchart illustrating an example of a method 100 for a time-based node election of a leader node in a distributed system, according to an implementation of the present disclosure. The steps of method 100 are host-oriented, meaning that the steps pertain to information sent from a host to nodes in a distributed system, as well as information received by the host from the nodes. A host can be, for example, a server that serves a distributed system to which nodes belong. For clarity of presentation, the description that follows generally describes method 100 in the context of the other figures in this description. However, it will be understood that method 100 may be performed, for example, by any suitable system, environment, software, and hardware, or a combination of systems, environments, software, and hardware, as appropriate. In some implementations, various steps of method 100 can be run in parallel, in combination, in loops, or in any order.

At 101, the host configures a same voting time, a same vote counting time, and a same leader node tenure for all nodes. For example, the host, such as a server, can identify a range of time (including a start time and end time) in which voting will occur and a range of time in which counting of votes will occur. The host can also designate a same leader node tenure. For example, the tenure can define a time period (such as ten minutes) during which the leader node, once elected, is considered a leader by other nodes. From 101, method 100 proceeds to 102.

At 102, time configuration information, including the configured voting time, the vote counting time, and the leader node tenure, is sent to all the nodes. The time configuration information is sent, for example, so that the nodes can vote during the voting time, and the number of votes can be counted during the vote counting time. A leader node can be elected according to a vote counting result. Thereafter, the nodes are allowed to perform periodic node elections within limits imposed by the leader node tenure. Only one leader is allowed in order to avoid ambivalent operations.

After configuration has occurred for the voting time, the vote counting time, and the leader node tenure, the host can notify each node in the distributed system. The notification is made so that each node can perform corresponding operations according to the configured voting time, vote counting time, and leader node tenure. Therefore, the configuration information that is sent by the host to each node can include the configured voting time, the vote counting time, and leader node tenure. After each node separately receives the time configuration information, each node can adjust (or set) a built-in clock according to the received time configuration information. In this way, different nodes can synchronously trigger the voting time and the vote counting time, to synchronously perform the corresponding operations.

During each election, after the nodes separately perform voting and vote counting operations according to the voting time and the vote counting time, the nodes and the leader node are free to perform other processing, such as to provide services. Over time, some nodes may need to process large amounts of data, which can cause changes in the processing and data updating capabilities of the nodes. Leader nodes, for example, may experience overloads, updating lag times (or latency), or crashing, which can affect the processing efficiency and services provided by the leader node. To avoid problems associated with leader nodes becoming less efficient, for example, elections can be held periodically to identify a leader node that is capable of being the leader node. If the elections are not held periodically, such as to allow the leader node to fail, then overall processing in the distributed system can be disrupted or stop. In this case, it may not be possible to perform another election again until the host re-configures a voting time and a vote counting time, which can decrease service processing efficiency of the distributed system. In order to avoid situations in which a dead leader holds a leadership for a long time (or even permanently), a leader's tenure is often set to a short time, such as a few seconds or tens of seconds.

Therefore, determination of the voting time, the vote counting time, and the leader node tenure is repeated periodically. For example, an interval cycle of the voting time can be 3000 ms. That is, 3000 ms following the end of the first voting time, a second voting time will begin. In another example, a leader node tenure can be configured to be 10 minutes. That is, after a node is elected as a leader node and serves as the leader node for 10 minutes, a next node election process can begin to determine a new leader node. Time cycles of voting times and vote counting times can be adjusted or set according to the needs of the actual application. The checking-and-election cycle can be any predefined period of time, for example, a few seconds or tens of seconds. Further, the duration of the election cycle can change, such as based on conditions (or predictions thereof) that may affect the reliability of leaders, including weather, location-based outages, hardware issues, and other conditions.

By using method 100, for example, a host can configure the same time for each node in a distributed system, allowing the nodes to perform voting and vote counting operations at the same time. Nodes that are originally asynchronous in time can perform the same type of operation synchronously, improving the efficiency of electing a leader node. In a synchronous technique, for example, all members can initiate an election, all members can vote, and all members can count ballots at almost the same time. After the host configures the voting time, the vote counting time, and the leader node tenure, different nodes may perform a corresponding voting or vote counting operation according to the time configuration information. After 102, method 100 stops.

Figure 2:
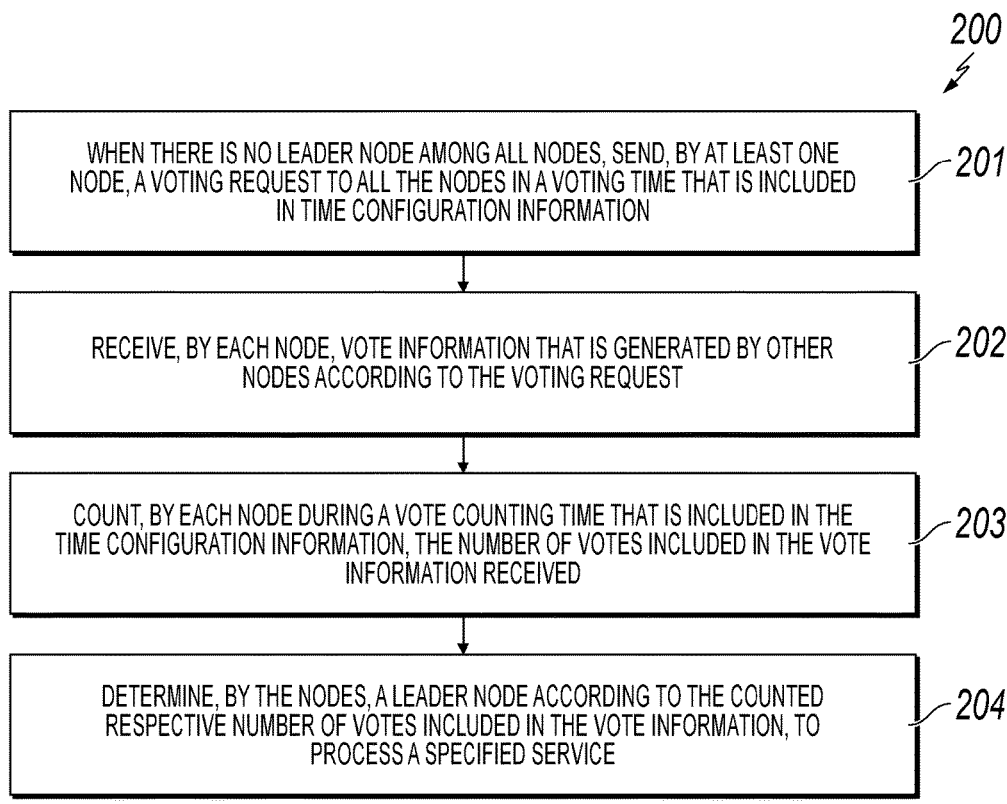
FIG. 2 is a flowchart illustrating an example of a method for node-initiated, time-based election of a leader node, according to an implementation of the present disclosure.

FIG. 2 is a flowchart illustrating an example of a method 200 for node-initiated, time-based election of a leader node, according to an implementation of the present disclosure. For example, method 200 can be used for determining a leader node where a leader node is not specified among all the nodes. The steps of method 200 are node-oriented, meaning that the steps pertain to information sent between nodes in a distributed system, as well as information received by the server from the nodes. In this case, method 200 includes steps in which voting requests are sent between nodes, vote information is received, and the leader node is determined by counting votes included in the received vote information. For clarity of presentation, the description that follows generally describes method 200 in the context of the other figures in this description. However, it will be understood that method 200 may be performed, for example, by any suitable system, environment, software, and hardware, or a combination of systems, environments, software, and hardware, as appropriate. In some implementations, various steps of method 200 can be run in parallel, in combination, in loops, or in any order.

At 201, where a leader node is not specified among all the nodes, at least one node sends a voting request to all the nodes during a voting time that is included in time configuration information. For example, after a distributed system enters a state such as maintenance or update, there will be no leader node among the nodes in the distributed system. In this case, the nodes may elect a leader node. Node election can be performed when there are at least two nodes. During node election, each node may send a voting request to one or more of the other nodes. In some implementations, a node can also send a voting request to itself.

Each node can initiate voting according to the voting time configured by the host. That is, the node can configure a built-in clock signal according to the time configuration information sent by the host. When the built-in clock of the node reaches the configured voting time, the node will perform the operation of sending a voting request. The voting request can include node information, such as a node identifier and a node state of the node. Different node states can reflect, for example, a data processing capacity and a data updating degree of the node. The information can be used by the other nodes to make a voting selection. From 201, method 200 proceeds to 202.

At 202, each node receives vote information that is generated by other nodes according to the voting request. For example, during the voting time and after receiving the voting request sent by the node, each of the other nodes may generate, according to the voting request, corresponding vote information and send the vote information to the corresponding node. From 202, method 200 proceeds to 203.

At 203, each node counts, in a vote counting time that is included in the time configuration information, the number of votes included in the received vote information. For example, each node can configure its own built-in clock according to the time configuration information received from the host. When the clock in the node reaches the configured vote counting time, for example, the node can perform a vote counting operation. From 203, method 200 proceeds to 204.

At 204, the nodes determine a leader node according to the counted respective number of votes included in the vote information, to process a specified service. For example, the process of determining a leader node by the nodes can be completed before the end of the vote counting time. Moreover, after one node is determined as a unique leader node, the leader node can send a notification message to other nodes, such as to inform other nodes that the leader node has been elected. After 204, method 200 stops.

Figure 3A:
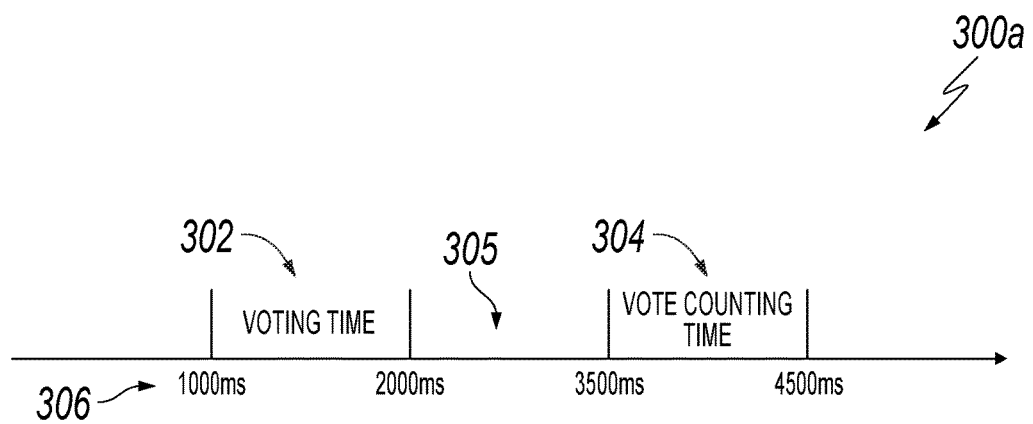
FIG. 3A is a diagram of an example of a voting time and a vote counting time that are separated by a separation time, according to an implementation of the present disclosure.

FIG. 3A is a diagram of an example of a voting time 302 and an example of a vote counting time 304 that are separated by a separation time 305, according to an implementation of the present disclosure. The voting time 302 and the vote counting time 304 can be configured by the host, for example, so as not to overlap. As a result, the nodes in the distributed system can perform the voting operation only during the voting time 302, and a vote counting operation can only be performed during the vote counting time 304. A node, for example, can use the voting time 302 and the vote counting time 304 in combination with a built-in clock, according to the time configuration information. The voting time 302 can have a range of time 306, for example, of 1000 ms to 2000 ms. The vote counting time 304 can have a range of time 306, for example, of 3500 ms to 4500 ms.

In FIG. 3A, when the built-in clock of a given node reaches 1000 ms, for example, each node can enter the voting time. During the voting time 302 (for example, having a duration of 1000 ms), the node can send vote information to other nodes, and the node can receive, during the voting time 302, vote information sent by the other nodes. When the clock reaches 2000 ms, for example, voting can be stopped.

During the vote counting time 304 with a range of time 306 of 3500 ms to 4500 ms, the node can process the received vote information, including counting and tabulating votes. When the clock reaches 4500 ms, for example, the node can stop counting votes, and the node can determine a leader node according to the counted votes. Allowing nodes to vote anytime during the voting time 302 can allow different nodes to synchronously perform other operations during the time that voting is not occurring.

Figure 3B:
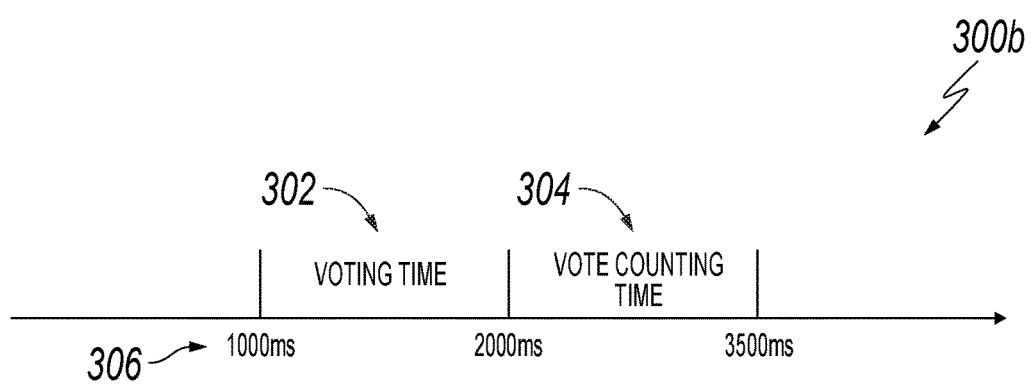
FIG. 3B is a diagram of an example of the vote counting time following directly after the voting time, according to an implementation of the present disclosure.

FIG. 3B is a diagram of an example of the vote counting time 304 following directly after the voting time 302, according to an implementation of the present disclosure. The vote counting time 304 can be configured by the host, for example, so that there is no time interval between the voting time 302 and the vote counting time 304. In other words, each node can directly switch from a voting state to a vote counting state when the clock reaches the time 306 of 2000 ms.

In the example shown in FIG. 3B, sending vote information between nodes can take some time. For example, 10 ms may be needed for a node to send generated vote information to a node. In this case, the clock of a node may already reach the time 306 of 2000 ms during transmission of the vote information at the time that the node enters the vote counting state. If the node is still receiving vote information upon entering the vote counting state when votes are to be counted, then the accuracy of the count can be affected. Voting accuracy can be improved, for example, if the node is configured to stop receiving the vote information when vote counting time begins.

Each node can independently process the vote information, including counting the votes, to determine a leader node. In some implementations, in order to ensure that a node can directly determine whether the node itself becomes a leader node based on counted votes, a threshold vote count can be implemented, such as a threshold based on a quorum (or half) of the number of nodes. All elections can be quorum-based, for example, where leaders are elected by a majority of the voters. For example, the threshold can be one half of the number of all the nodes. If the vote count determined by the node exceeds the threshold, then the node can become the leader node. Therefore, with regards to step 204 of method 200, determining the leader node can include determining, by the node, the node itself as a leader node when the node determines that the vote count exceeds a preset threshold.

In some implementations, the host can notify all nodes in the distributed system as to the number of nodes in the distributed system. This can occur, for example, when the host sends voting requests to all of the nodes, or at other times. In this way, each node in the distributed system knows the total number of nodes in the distributed system from which a voting threshold can be calculated. For example, voting nodes can determine that a vote count exceeds threshold (such as half of the number of nodes) when the vote count indicates that more than half of the nodes have voted for the same leader node.

Figure 3C:
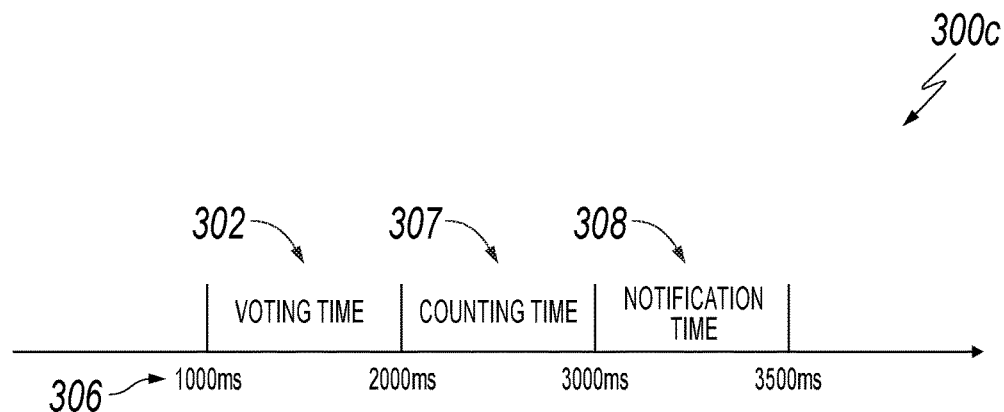
FIG. 3C is a diagram of an example of the vote counting time being divided into a counting time and a notification time, according to an implementation of the present disclosure.

FIG. 3C is a diagram of an example of the vote counting time 304 being divided into a counting time 307 and a notification time 308, according to an implementation of the present disclosure. During the counting time 307 that ranges in the time 306 of 2000 ms to 3000 ms, for example, each node can count votes. If no notification from a leader node (indicating that a new leader has been elected) is received during the notification time 308, then the nodes can perform the next node election.

Figure 3D:
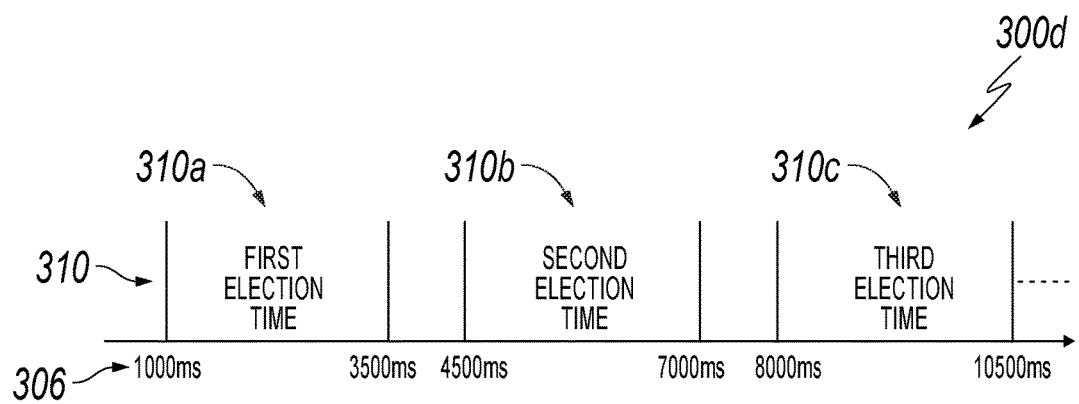
FIG. 3D is a diagram of an example of a sequence of election times, according to an implementation of the present disclosure.

FIG. 3D is a diagram of an example of a sequence 310 of election times 310a-310c, according to an implementation of the present disclosure. The election times 310a-310c can be allocated by the host, for example, over a short period during which a leader node is elected. Each of the election times 310a-310c can include a voting time 302 and a vote counting time 304 (optionally split into the counting time 307 and the notification time 308). If a leader node is not determined during the first election time 310a, such as if no candidate node receives more than half of the votes, then node election can be performed again during the second election time 310b. The sequence 310 can be repeated until a leader node is elected, such as using the third election time 310c if necessary. Subsequently, after a leader node is elected, node election can be performed periodically according to the leader node tenure and other time configuration information.

Figure 4:
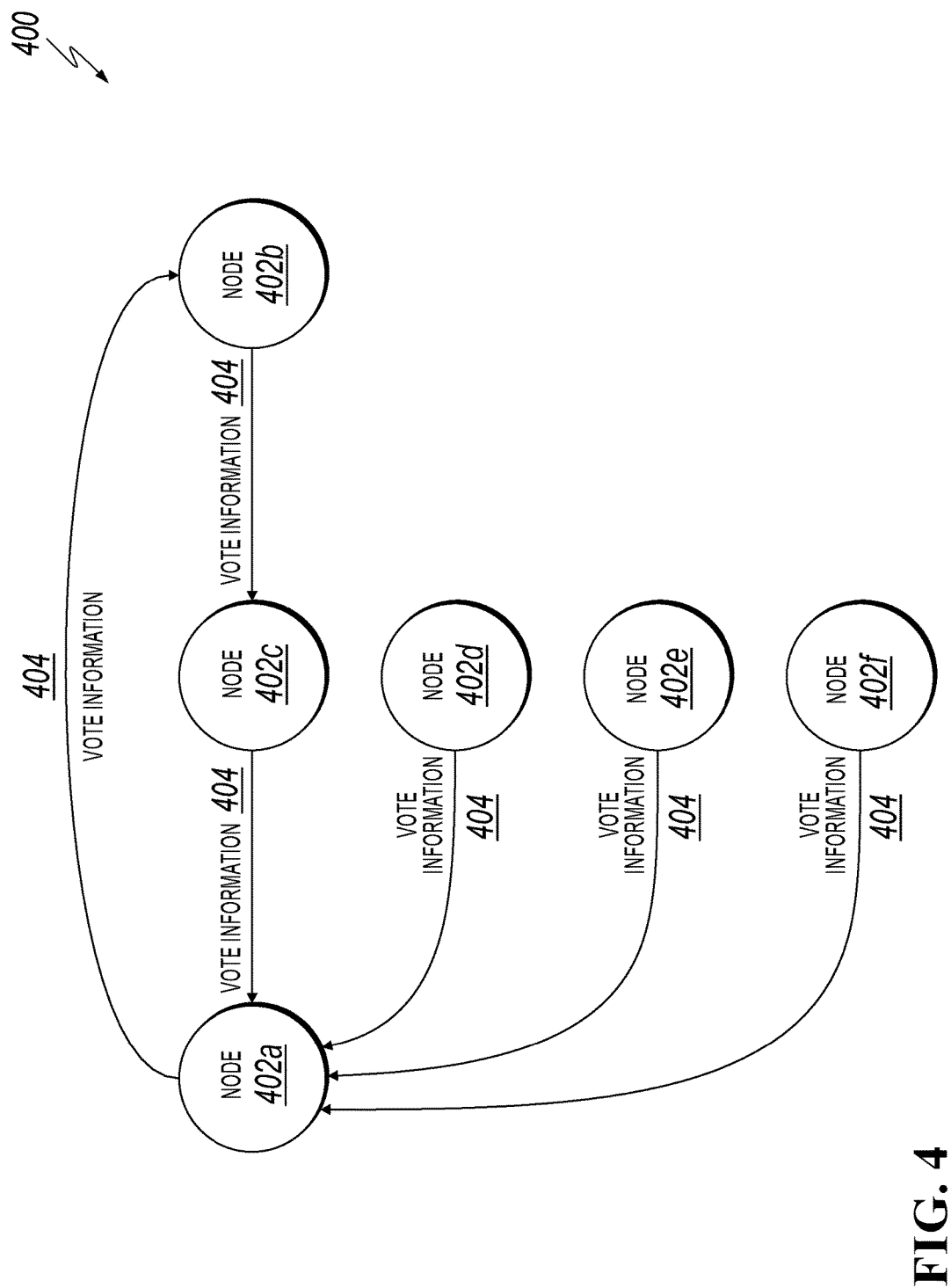
FIG. 4 is a diagram of an example of a distributed system that includes nodes, according to an implementation of the present disclosure.

FIG. 4 is a diagram of an example of a distributed system 400 that includes nodes 402a-402f, according to an implementation of the present disclosure. During a voting time 302, for example, all six of the nodes 402a-402f can campaign, including sending voting requests to other nodes and receiving vote information 404. Each node can receive a voting request, and each node can send voting requests to the other nodes. When a node sends voting requests to the other nodes, typically the node itself is excluded from receiving a voting request. For example, node 402a can send voting requests to other nodes 402b-402f.

As shown in FIG. 4, the node 402a has received four votes, and nodes 402b and 402c have each received one vote, as shown by the vote information 404 that each of the nodes 402a-402c has received. This vote count can exist, for example, at the end of the voting time 302. During the vote counting time 304, each node can perform its own count of the votes that the node has received. At this time, the node 402a can count four votes, the node 402b can count one vote, and the node 402c can count one vote. None of the other nodes 402d-402f have received vote information 404, so the vote counts by the nodes 402d-402f can be zero.

In this example, because there are six nodes 402a-402f, the threshold for vote counting can be set to three. As such, since the four votes counted by the node 402a exceeds the threshold, the node 402a can determine itself to be the leader node. The node 402a can then send a broadcast to the other nodes 402b-402f to notify the other nodes 402b-402f that node 402a has become the leader node.

In other voting scenarios, it can be the case that no leader node is elected. This can occur because each of the nodes 402a-402f votes "autonomously" during an election. As such, it is possible that the vote count determined by each of the nodes does not exceed the preset threshold. As an example, if the vote information 404 generated by the node 402f had been sent to the node 402c instead of being sent to the node 402a, then the vote count of the node 402a would have been only three votes. Neither the node 402a (with a vote count of three) nor the node 402c (now with a vote count of two) would have enough votes to exceed the threshold of three votes. Therefore, none of the nodes 402a-402f can determine itself to be the leader node. As a result, none of the nodes 402a-402f would receive a notification message of a leader node within a specified period of time, indicating that no leader node has been elected during the current node election. In this situation, another election can occur, such the situation that can occur during the sequence 310.

Figure 5:
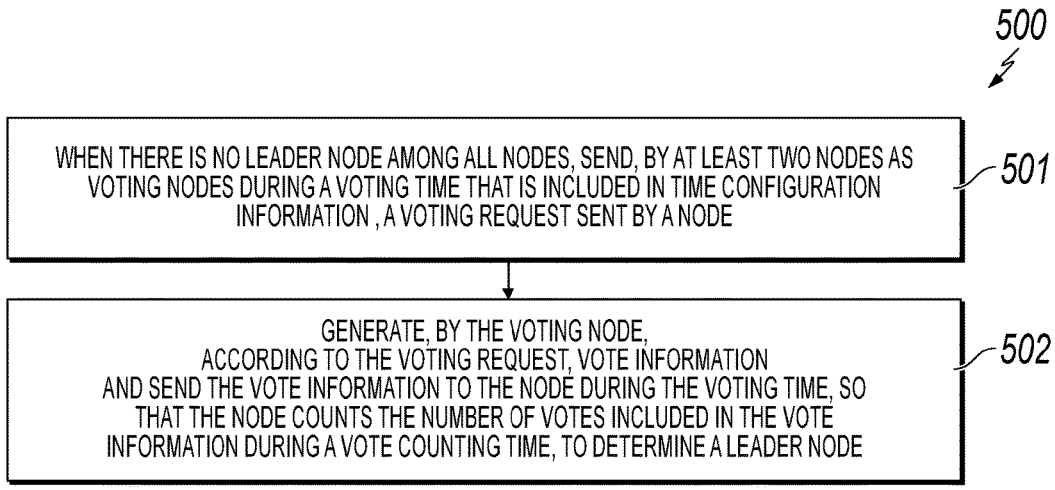
FIG. 5 is a flowchart illustrating an example of a method for a time-based node election, according to an implementation of the present disclosure.

FIG. 5 is a flowchart illustrating an example of a method 500 for a time-based node election, according to an implementation of the present disclosure. For example, method 500 can be used for determining a leader node in a distributed system. In this case, method 500 can include receiving vote information from nodes. Then vote information can be generated and sent to the nodes during a voting time so that a node can determine the leader node. For clarity of presentation, the description that follows generally describes method 500 in the context of the other figures in this description. However, it will be understood that method 500 may be performed, for example, by any suitable system, environment, software, and hardware, or a combination of systems, environments, software, and hardware, as appropriate. In some implementations, various steps of method 500 can be run in parallel, in combination, in loops, or in any order.

At 501, when there is no determined leader node among all the nodes, at least two nodes as voting nodes receive, during a voting time that is included in time configuration information, a voting request sent by a node. For example, voting requests can be sent by the nodes 402a-402f, serving as nodes, to other nodes 402a-402f. In some implementations, a voting node can receive time configuration information sent by a host, adjust a clock in the voting node, and configure a voting time and a vote counting time for the voting to occur in response to the received voting request. From 501, method 500 proceeds to 502.

At 502, the voting nodes generate, according to the voting request, vote information and send the vote information to the node during the voting time, so that the node counts the number of votes included in the vote information during a vote counting time, to determine a leader node. For example, voting nodes among the nodes 402a-402f can receive a voting request sent by at least one node from among the nodes 402a-402f. As only one leader node is finally elected, the voting node votes for only one node. That is, the voting node selects one node according to the received voting requests, generates vote information for the selected node, and sends the vote information to the selected node. If a voting node receives multiple voting requests, the voting node can select a node according to node information included in the voting requests.

In some implementations, generating, by the voting node, vote information and sending the vote information to the node can include the following. The voting node can determine node information included in the received voting request, determine a priority of the node according to the node information, select a node with a maximum priority, generate vote information for the node, and send the vote information to the selected node. For example, using priorities, nodes in Mountain View can have a higher priority than nodes in Seattle, and nodes in Seattle can have a higher priority than nodes in New York. In another example, nodes with smaller IP addresses can have high priorities. Priorities can be defined by an administrator. In this way, a voting node can vote for the candidate leader node believe to be the most important, as indicated by the priority.

Node information can include, but is not limited to, information that can reflect a data processing capacity and a processing state of the node. Data processing capacity information can include, for example, data updating information, load processing information, and hardware configuration information of the node. Using the data processing capacity information, the voting node can determine priorities of different nodes according to the node information, such as to reflect comprehensive state levels of different nodes. In some implementations, to complete the voting process, the voting node may select a node with a maximum priority, generate corresponding vote information, and send the vote information to the node. After 502, method 500 stops.

Methods 200 and 500 are both processes used when there is no leader node in the distributed system, and the nodes can determine a leader node according to the voting time and the vote counting time configured by the host. However, if a leader node already exists in the distributed system, other processes can be used, such as described with reference to FIGS. 6-9.

Figure 6:
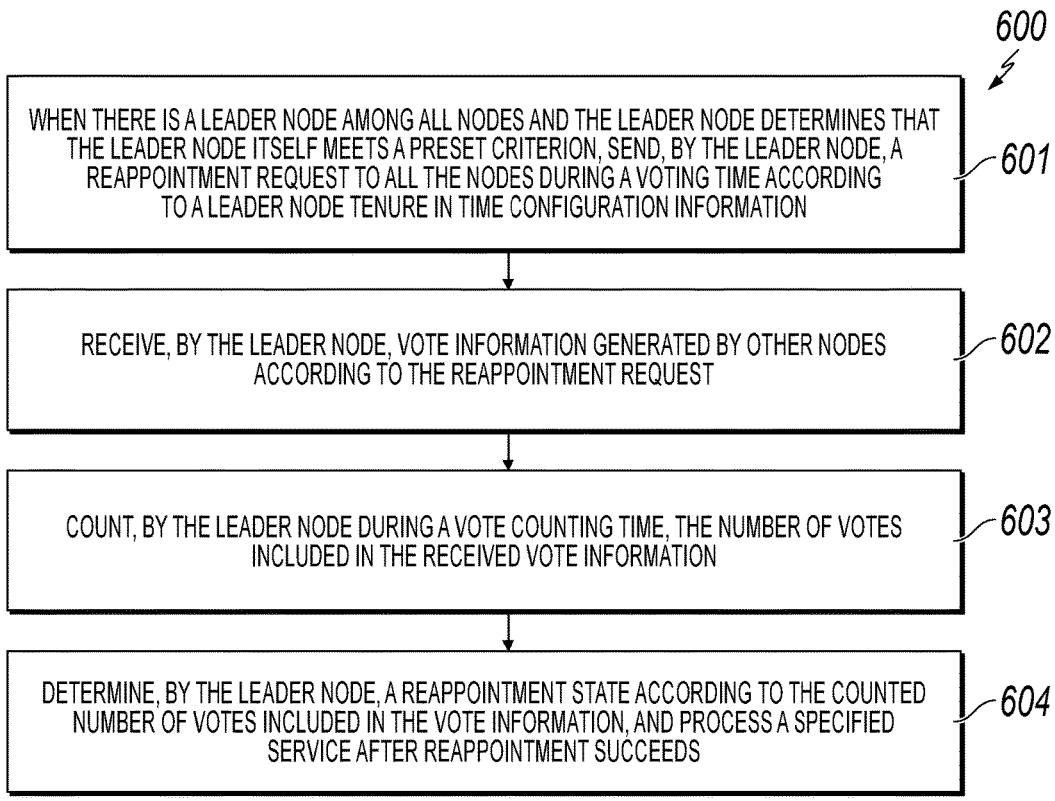
FIG. 6 is a flowchart illustrating an example of a method for a time-based node election, according to an implementation of the present disclosure.

FIG. 6 is a flowchart illustrating an example of a method 600 for a time-based node election, according to an implementation of the present disclosure. For example, method 600 can be used for determining a leader node in a distributed system. In this case, the leader node can send reappointment requests to the other nodes, receive vote information from the other nodes, and determine a reappointment state based on a count of votes included in the received vote information. Steps of method 600 include steps that are from the standpoint of the leader node. For clarity of presentation, the description that follows generally describes method 600 in the context of the other figures in this description. However, it will be understood that method 600 may be performed, for example, by any suitable system, environment, software, and hardware, or a combination of systems, environments, software, and hardware, as appropriate. In some implementations, various steps of method 600 can be run in parallel, in combination, in loops, or in any order.

At 601, when there is a leader node determined among all the nodes of a distributed system, and the leader node determines that the leader node itself meets a preset criteria, the leader node can send a reappointment request to all the nodes during a voting time according to a leader node tenure in time configuration information. After a leader node is determined, for example, as described with reference to FIGS. 2 and 5, another node election is to be performed when the tenure of the leader is about to end (at the end of the tenure time). In this case, nodes other than the leader node do not send voting requests, but only the leader node may send a reappointment request to other nodes.

A distributed system may process a large volume of information, such as during execution of an actual application. For example, there may be a lag in update of data (such as metadata) maintained by the leader node. In another example, a situation can occur in which the processing load of the leader node increases continuously, resulting in a decrease in service processing efficiency thereof. These examples can indicate, for example, that the leader node does not meet the preset criteria of a leader node, such as no longer being adequate for performing the operations required of a leader node. In some implementations, when the next voting time begins, the current leader node can judge whether its current node state meets the preset criteria of a leader node. At a given time, the current leader node can determine, for example, that the processing load and the data updating degree of the current leader node do not affect the efficiency of processing a specified service. At this time, the current leader node can send a reappointment request to the other nodes, indicating that the current leader node wants to be reappointed as the leader node.

Preset criteria of a leader node can include, but are not limited to, a load processing criterion, a data updating degree criterion, and other criteria or a combination of present criteria that may be statically set by an administrator. As different nodes can have different hardware configurations, such as different processing performance and storage space, preset criteria of the nodes may also be different. In some implementations, each node may generate preset criteria according to its own hardware configuration and processing capabilities.

The preset criteria of each node can be preset in the form of a standard value, such as a percentage, a rate, or some other numeric value or indicator. For example, for a node, a load processing criterion may indicate that a usage rate of a central processing unit (CPU) does not exceed 80%. In other words, when the usage of the CPU does not exceed 80%, it may be considered that the node meets the preset criteria. From 601, method 600 proceeds to 602.

At 602, the leader node receives vote information generated by other nodes according to the reappointment request. For example, the node 402a of FIG. 4 can receive vote information 404 from the other nodes, such as the nodes 402c-402f of FIG. 4. From 602, method 600 proceeds to 603.

At 603, the leader node counts, in a vote counting time, the number of votes included in the received vote information. For example, the node 402a can count the votes included in the vote information 404 of FIG. 4. From 603, method 600 proceeds to 604.

At 604, the leader node determines a reappointment state according to the count of votes included in the vote information, and the leader node processes a specified service after reappointment succeeds. For example, when the leader node sends the reappointment request to other nodes, there are no other nodes in the distributed system that are campaigning. This means that each node receives a reappointment request only from the leader node, and the leader node is usually reappointed successfully. After the leader node is successfully reappointed, the leader node can send a notification message to each node, such as to notify each node that the leader node has been reappointed successfully. Upon completion of the election, the successfully reappointed leader node can continue to process the specified service, and other nodes in the distributed system can continue to process services normally. If reappointment fails, then another election can be held. After 604, method 600 stops.

Figure 7:
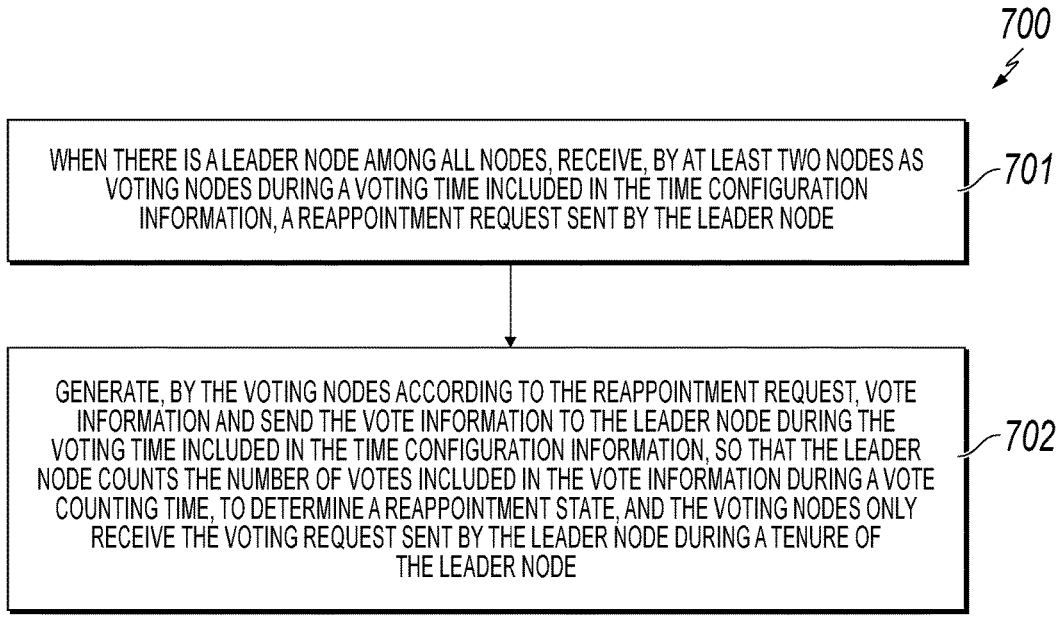
FIG. 7 is a flowchart illustrating an example of a method for a time-based node election, according to an implementation of the present disclosure.

FIG. 7 is a flowchart illustrating an example of a method 700 for a time-based node election, according to an implementation of the present disclosure. For example, method 700 can include steps for determining a leader node in a distributed system. In this case, at least two nodes in a distributed system can receive reappointment requests send by the leader node, send vote information to the leader node, from which the leader node can determine a reappointment state. Method 700 is similar to method 600, except that steps of method 700 are from the standpoint of the non-leader nodes. For clarity of presentation, the description that follows generally describes method 700 in the context of the other figures in this description. However, it will be understood that method 700 may be performed, for example, by any suitable system, environment, software, and hardware, or a combination of systems, environments, software, and hardware, as appropriate. In some implementations, various steps of method 700 can be run in parallel, in combination, in loops, or in any order.

At 701, when there is a determined leader node among all nodes of a distributed system, at least two nodes (as voting nodes) receive, during a voting time included in time configuration information, a reappointment request sent by the leader node. For example, the nodes 402b-402e can receive a reappointment request from the node 402a. The leader node can send voting requests to the voting nodes only during the tenure of the leader node. From 701, method 700 proceeds to 702.

At 702, the voting nodes generate, according to the reappointment request, vote information and send the vote information to the leader node during the voting time included in the time configuration information, and the leader node counts the number of votes included in the vote information during a vote counting time to determine a reappointment state. After 702, method 700 stops.

Methods 600 and 700 are applicable in situations in which a leader node already exists in the distributed system. When a next voting time begins, all the nodes in the distributed system may synchronously enter a voting state, and only the leader node sends a reappointment request to other nodes. The nodes that receive the reappointment request may send the generated voting requests to the leader node. In this way, other nodes do not send voting requests to each other to determine a new leader node, thus effectively reducing processing load of each node and also improving the leader node election efficiency. Moreover, during the tenure of the leader node, no voting node will receive voting requests sent by other nodes. In this way, it can be ensured that each voting node only receives the voting request sent by the leader node.

During an actual application, each node in the distributed system may process a large quantity of services. As a result, the processing load of the leader node may increase, and the data updating of the leader node may lag behind. This can cause the leader node to stop meeting the preset criteria. In this case, a new leader node can be selected, such as using a time-based node election method.

Figure 8:
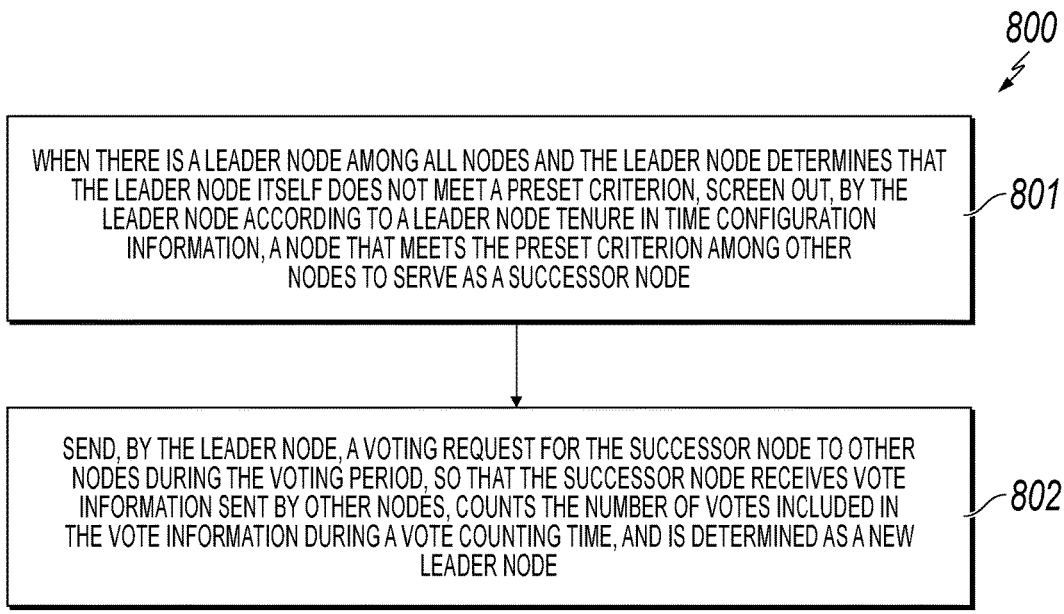
FIG. 8 is a flowchart illustrating an example of a method for leader node actions when determining a new leader node, according to an implementation of the present disclosure.

FIG. 8 is a flowchart illustrating an example of a method 800 for leader node actions when determining a new leader node, according to an implementation of the present disclosure. For example, method 800 can be used for determining a new leader node among other nodes in a distributed system. Steps of method 800 are from the standpoint of the leader node. For clarity of presentation, the description that follows generally describes method 800 in the context of the other figures in this description. However, it will be understood that method 800 may be performed, for example, by any suitable system, environment, software, and hardware, or a combination of systems, environments, software, and hardware, as appropriate. In some implementations, various steps of method 800 can be run in parallel, in combination, in loops, or in any order.

At 801, when there is already a determined leader node among all nodes of the distributed system, and the leader node determines that the leader node itself does not meet a preset criteria, the leader node screens out, according to a leader node tenure in time configuration information, a node that meets the preset criteria among other nodes to serve as a successor node. Screening out the node can include identifying the node that, for example, is determined among the other nodes at being capable of meeting the preset criteria of a leader node. When the leader node determines that the leader node itself does not meet the preset criteria, the leader node can indicate, for example, that the leader node may have a high processing load or a low data updating degree. In this case, the efficiency of the leader node for processing a specified service can be determined to be severely affected. That is, the current leader node is no longer suitable for processing the specified service consistent with the preset criteria. This can occur, for example, before the tenure of the leader node ends. Screening out a successor node can include, for example, the leader node sending a query request to other nodes to query node information of other nodes and selecting a successor node according to the node information received in response to the queries. In some implementations, the host can specify that the leader node is to select a successor node, that is, to initiate the selection of a new leader node. Then, after receiving a re-selection instruction from the host, the current leader node can select, from other nodes, a node as a successor node of the leader node. From 801, method 800 proceeds to 802.

At 802, the leader node sends a voting request for the successor node to other nodes during the voting period so that the successor node receives vote information sent by other nodes, and the leader node counts the number of votes included in the vote information during a vote counting time to determine a new leader node. For example, during the voting time, the voting request sent by the leader node to other nodes can include a node identifier of the successor node. Using the node identifier, for example, a node receiving the voting request can generate corresponding vote information, and the voting node can send the vote information to the successor node. In this way, each voting node sends the vote information to the successor node only and not to the current leader node. As a result, only the successor node receives the vote information sent by each voting node. During the vote counting time, the successor node can count votes to determine the leader node. The successor node can also send a notification message to each node, such as to notify each node that the successor node has become the new leader node. After 802, method 800 stops.

Figure 9:
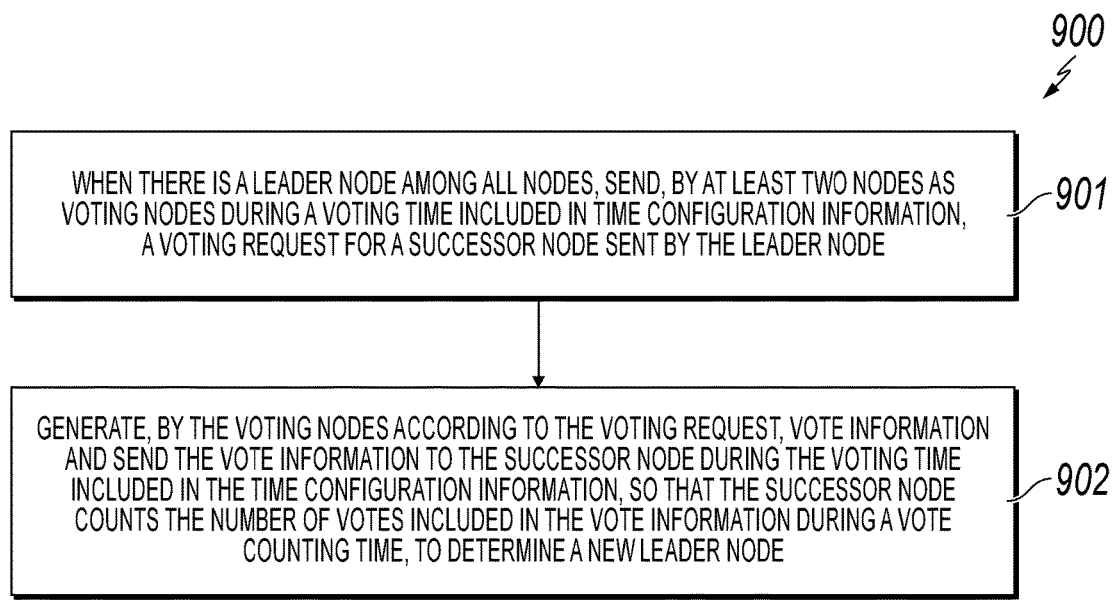
FIG. 9 is a flowchart illustrating an example of a method for non-leader node actions when determining a new leader node, according to an implementation of the present disclosure.

FIG. 9 is a flowchart illustrating an example of a method 900 for non-leader node actions when determining a new leader node, according to an implementation of the present disclosure. For example, method 900 can be used for determining a new leader node among other nodes in a distributed system. Steps of method 900 are from the standpoint of the non-leader nodes, and the steps correspond to steps performed by the non-leader node relative to method 800. For clarity of presentation, the description that follows generally describes method 900 in the context of the other figures in this description. However, it will be understood that method 900 may be performed, for example, by any suitable system, environment, software, and hardware, or a combination of systems, environments, software, and hardware, as appropriate. In some implementations, various steps of method 900 can be run in parallel, in combination, in loops, or in any order.

At 901, when there is a determined leader node among all nodes of the distributed system, at least two nodes (acting as voting nodes) receive, during a voting time included in time configuration information, a voting request for a successor node sent by the leader node. For example, the nodes 402*b*-402*e* can receive a voting request from the node 402*a* (when the current leader node). From 901, method 900 proceeds to 902.

At 902, the voting nodes generate, according to the voting request, vote information. The voting nodes send the vote information to the successor node during the voting time included in the time configuration information so that the successor node can count the number of votes included in the vote information during a vote counting time in order to determine a new leader node. The voting request sent by the leader node can include a node identifier of the successor node that can be used by the voting nodes when generating corresponding vote information according to the voting request. Using the node identifier, the voting nodes node can send the vote information to the successor node according to the node identifier of the successor node, without sending the vote information to other nodes. This can ensure that the successor node can become a new leader node in a more efficient way.

When no leader node currently exists in the distributed system, the host of the distributed system can configure the same voting time and the same vote counting time for the voting nodes. This configuration can allow the voting nodes to synchronously vote during the voting time, and the votes can be counted synchronously during the vote counting time. This technique can help to avoid timing issues and uncertainty associated with each node's voting and vote counting, and the efficiency of electing a leader node can be improved.

When a next voting time and vote counting time begin, the leader node can judge its own state. The leader node can then generate a voting request for the leader node itself or a voting request for a successor node. After receiving the voting requests, the other nodes can generate vote information according to the voting request, and the other nodes can send the vote information to the corresponding node. Such a manner of electing leaders and successors can help to ensure that a currently-elected leader node is in a high-performance state for processing one or more specified services, and this can improve the service processing efficiency of the whole distributed system overall. After 902, method 900 stops.

Figure 10:
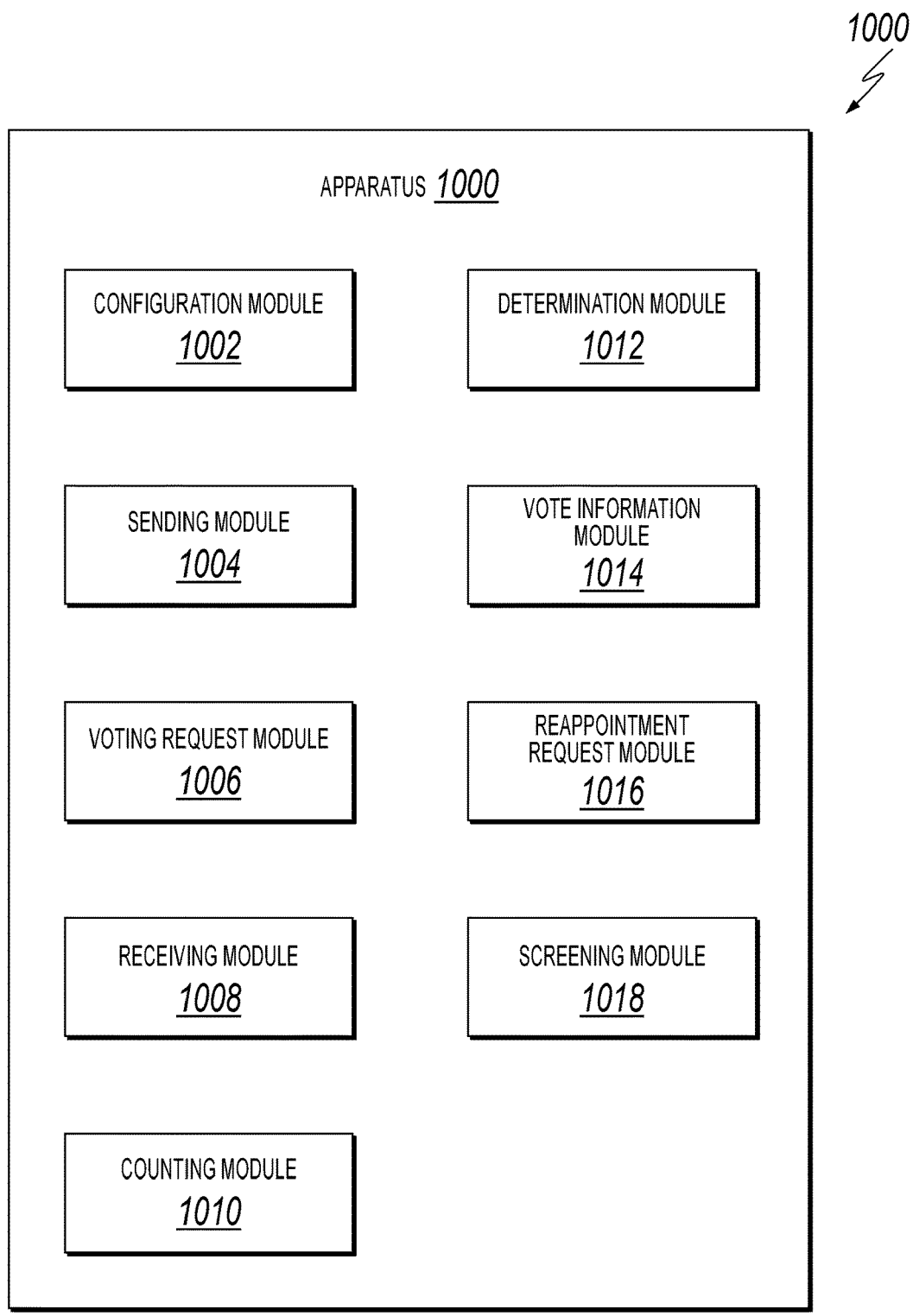
FIG. 10 is a diagram illustrating an example of a computer-implemented, time-based node election system, according to an implementation of the present disclosure.

FIG. 10 is a diagram illustrating an example of a computer-implemented, time-based node election system 1000, according to an implementation of the present disclosure. For example, the time-based node election system 1000 can be implemented as part of a host and nodes in a distributed system, such as the nodes 402*a*-402*e*. In some implementations, the time-based node election system 1000 includes modules that can perform the operations for steps in methods 100, 200, 500, 600, 700, 800, and 900. In some implementations, the time-based node election system 1000 includes the following modules.

A configuration module 1002 can configure a same voting time, a same vote counting time, and a same leader node tenure for all nodes. For example, the same vote counting time can be the voting time 302, and the same vote counting time can be the vote counting time 304. The same leader node tenure can be defined as a time period (such as ten minutes) during which the leader node, once elected, will be the leader node.

A sending module 1004 can send time configuration information that includes the configured voting time, the vote counting time, and the leader node tenure to all the nodes. The information can be sent, for example, so that the nodes can vote during the voting time, count the number of votes during the vote counting time, and elect a leader node according to a resulting vote counting.

A voting request module 1006 can send a voting request to all the nodes during a voting time that is included in time configuration information. The voting request module 1006 can also send a voting request for the successor node to other nodes during the voting period. The voting requests are sent so that the successor node can receive vote information sent by other nodes, count the number of votes during a vote counting time, and determine a new leader node.

A receiving module 1008 can receive vote information that is generated by other nodes according to the voting request. The receiving module 1008 can also stop receiving the vote information when the vote counting time begins. The receiving module 1008 can also receive, during a voting time that is included in time configuration information, a voting request sent by a node. The receiving module 1008 can also receive vote information generated by other nodes according to a reappointment request. The receiving module 1008 can also receive, during a voting time included in time configuration information, a reappointment request sent by the leader node. The receiving module 1008 can also receive, during a voting time included in time configuration information, a voting request for a successor node sent by the leader node.

A counting module 1010 can count, during a vote counting time that is included in the time configuration information, the number of votes included in received vote information.

A determination module 1012 can determine a leader node according to the counted number of votes included in the vote information to process a specified service. The determination module 1012 can also determine the node as a leader node when judging that the counted number of votes exceeds a preset threshold. The determination module 1012 can also determine a reappointment state according to the counted number of votes and process a specified service after reappointment succeeds.

A vote information module 1014 can generate, according to a voting request, vote information and send the vote information to a node during the voting time. The vote information is sent, for example, so that the node can count the number of votes included in the vote information during a vote counting time in order to determine a leader node. The vote information module 1014 can also determine node information included in the received voting request, determine a priority of the node according to the node information, select a node with a maximum priority, generate vote information for the node, and send the vote information to the selected node. The vote information module 1014 can also generate, according to the reappointment request, vote information, and send the vote information to the leader node during the voting time included in the time configuration information. The vote information is sent, for example, so that the leader node can count the number of votes included in the vote information during a vote counting time and determine a reappointment state. Voting nodes can be configured to receive the voting request sent by the leader node only during the tenure of the leader node. The vote information module 1014 is also configured to generate, according to the voting request, vote information and send the vote information to the successor node during the voting time included in the time configuration information. The vote information is sent, for example, so that the successor node can count the number of votes included in the vote information during a vote counting time in order to determine a new leader node.

A reappointment request module 1016 can send a reappointment request to all the nodes during a voting time according to a leader node tenure included in time configuration information. A screening module 1018 can screen out, according to a leader node tenure in time configuration information, a node that meets the preset criteria among other nodes to serve as a successor node.

Figure 11:
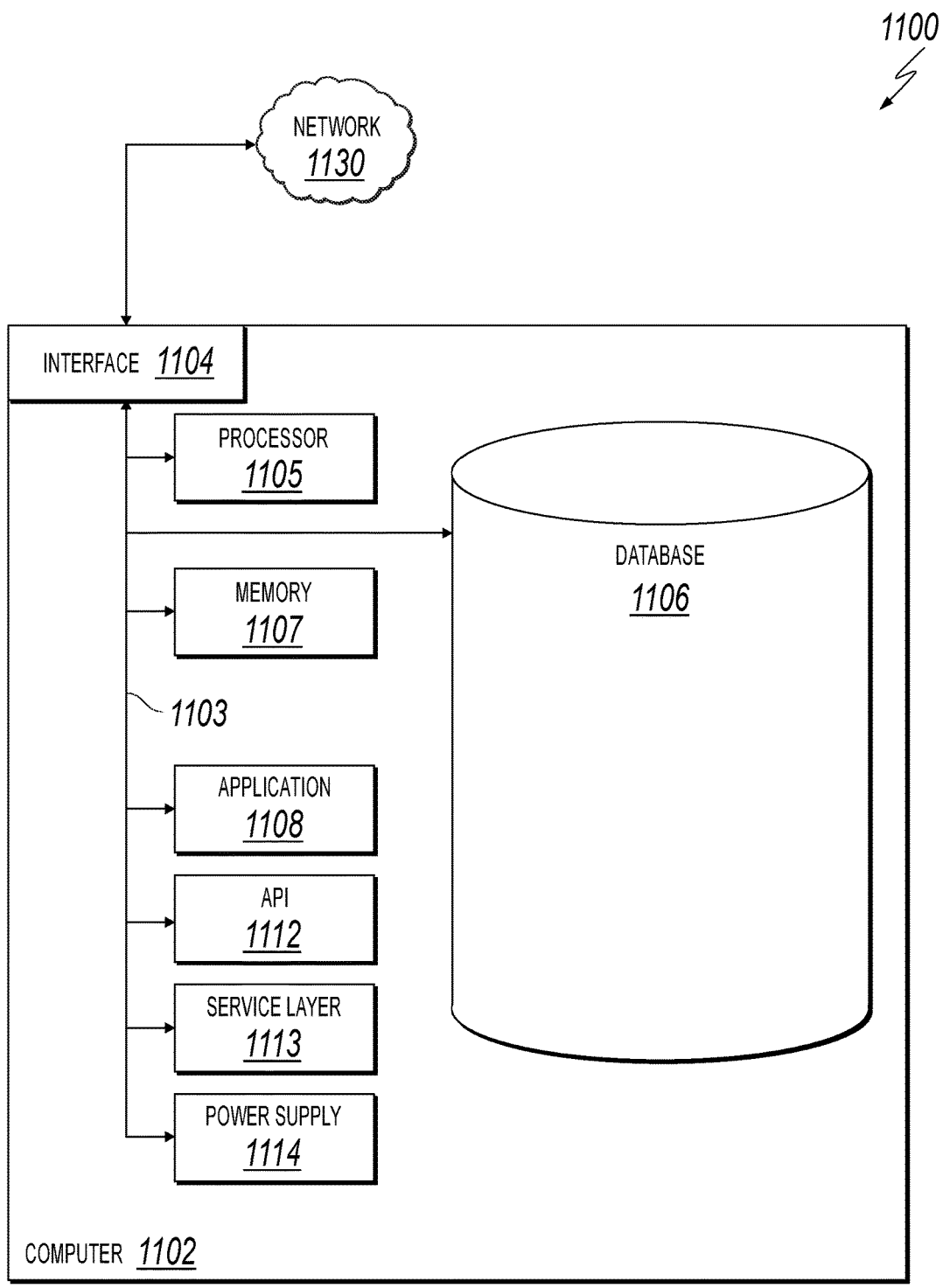
FIG. 11 is a block diagram illustrating an example of a computer system used to provide computational functionalities associated with described algorithms, methods, functions, processes, flows, and procedures as described in the instant disclosure, according to an implementation of the present disclosure.

FIG. 11 is a block diagram of an example of a computer system 1100 used to provide computational functionalities associated with described algorithms, methods, functions, processes, flows, and procedures, as described in the instant disclosure, according to an implementation of the present disclosure. The illustrated computer 1102 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 1102 can comprise a computer that includes an input device, such as a keypad, keyboard, touch screen, another input device, or a combination of input devices that can accept user information, and an output device that conveys information associated with the operation of the computer 1102, including digital data, visual, audio, another type of information, or a combination of types of information, on a graphical-type user interface (UI) (or GUI) or other UI.

The computer 1102 can serve in a role in a computer system as a client, network component, a server, a database or another persistency, another role, or a combination of roles for performing the subject matter described in the present disclosure. The illustrated computer 1102 is communicably coupled with a network 1130. In some implementations, one or more components of the computer 1102 can be configured to operate within an environment, including cloud-computing-based, local, global, another environment, or a combination of environments.

At a high level, the computer 1102 is an electronic computing device operable to receive, transmit, process, store, or manage data and information associated with the described subject matter. According to some implementations, the computer 1102 can also include or be communicably coupled with a server, including an application server, e-mail server, web server, caching server, streaming data server, another server, or a combination of servers.

The computer 1102 can receive requests over network 1130 (for example, from a client software application executing on another computer 1102) and respond to the received requests by processing the received requests using a software application or a combination of software applications. In addition, requests can also be sent to the computer 1102 from internal users (for example, from a command console or by another internal access method), external or third-parties, or other entities, individuals, systems, or computers.

Each of the components of the computer 1102 can communicate using a system bus 1103. In some implementations, any or all of the components of the computer 1102, including hardware, software, or a combination of hardware and software, can interface over the system bus 1103 using an application programming interface (API) 1112, a service layer 1113, or a combination of the API 1112 and service layer 1113. The API 1112 can include specifications for routines, data structures, and object classes. The API 1112 can be either computer-language independent or dependent and refer to a complete interface, a single function, or even a set of APIs. The service layer 1113 provides software services to the computer 1102 or other components (whether illustrated or not) that are communicably coupled to the computer 1102. The functionality of the computer 1102 can be accessible for all service consumers using this service layer. Software services, such as those provided by the service layer 1113, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 1102, alternative implementations can illustrate the API 1112 or the service layer 1113 as stand-alone components in relation to other components of the computer 1102 or other components (whether illustrated or not) that are communicably coupled to the computer 1102. Moreover, any or all parts of the API 1112 or the service layer 1113 can be implemented as a child or a sub-module of another software module, enterprise application, or hardware module without departing from the scope of the present disclosure.

The computer 1102 includes an interface 1104. Although illustrated as a single interface 1104 in FIG. 11, two or more interfaces 1104 can be used according to particular needs, desires, or particular implementations of the computer 1102. The interface 1104 is used by the computer 1102 for communicating with another computing system (whether illustrated or not) that is connected to the network 1130 in a distributed environment. Generally, the interface 1104 is operable to communicate with the network 1130 and comprises logic encoded in software, hardware, or a combination of software and hardware. More specifically, the interface 1104 can comprise software supporting one or more communication protocols associated with communications such that the network 1130 or interface's hardware is operable to communicate physical signals within and outside of the illustrated computer 1102.

The computer 1102 includes a processor 1105. Although illustrated as a single processor 1105 in FIG. 11, two or more processors can be used according to particular needs, desires, or particular implementations of the computer 1102.

Generally, the processor 1105 executes instructions and manipulates data to perform the operations of the computer 1102 and any algorithms, methods, functions, processes, flows, and procedures as described in the present disclosure.

The computer 1102 also includes a database 1106 that can hold data for the computer 1102, another component connected to the network 1130 (whether illustrated or not), or a combination of the computer 1102 and another component. For example, database 1106 can be an in-memory, conventional, or another type of database storing data consistent with the present disclosure. In some implementations, database 1106 can be a combination of two or more different database types (for example, a hybrid in-memory and conventional database) according to particular needs, desires, or particular implementations of the computer 1102 and the described functionality. Although illustrated as a single database 1106 in FIG. 11, two or more databases of similar or differing types can be used according to particular needs, desires, or particular implementations of the computer 1102 and the described functionality. While database 1106 is illustrated as an integral component of the computer 1102, in alternative implementations, database 1106 can be external to the computer 1102.

The computer 1102 also includes a memory 1107 that can hold data for the computer 1102, another component or components connected to the network 1130 (whether illustrated or not), or a combination of the computer 1102 and another component. Memory 1107 can store any data consistent with the present disclosure. In some implementations, memory 1107 can be a combination of two or more different types of memory (for example, a combination of semiconductor and magnetic storage) according to particular needs, desires, or particular implementations of the computer 1102 and the described functionality. Although illustrated as a single memory 1107 in FIG. 11, two or more memories 1107 or similar or differing types can be used according to particular needs, desires, or particular implementations of the computer 1102 and the described functionality. While memory 1107 is illustrated as an integral component of the computer 1102, in alternative implementations, memory 1107 can be external to the computer 1102.

The application 1108 is an algorithmic software engine providing functionality according to particular needs, desires, or particular implementations of the computer 1102, particularly with respect to functionality described in the present disclosure. For example, application 1108 can serve as one or more components, modules, or applications. Further, although illustrated as a single application 1108, the application 1108 can be implemented as multiple applications 1108 on the computer 1102. In addition, although illustrated as integral to the computer 1102, in alternative implementations, the application 1108 can be external to the computer 1102.

The computer 1102 can also include a power supply 1114. The power supply 1114 can include a rechargeable or non-rechargeable battery that can be configured to be either user- or non-user-replaceable. In some implementations, the power supply 1114 can include power-conversion or management circuits (including recharging, standby, or another power management functionality). In some implementations, the power-supply 1114 can include a power plug to allow the computer 1102 to be plugged into a wall socket or another power source to, for example, power the computer 1102 or recharge a rechargeable battery.

There can be any number of computers 1102 associated with, or external to, a computer system containing computer 1102, each computer 1102 communicating over network 1130. Further, the term "client," "user," or other appropriate terminology can be used interchangeably, as appropriate, without departing from the scope of the present disclosure. Moreover, the present disclosure contemplates that many users can use one computer 1102, or that one user can use multiple computers 1102.

Described implementations of the subject matter can include one or more features, alone or in combination.

For example, in a first implementation, a computer-implemented method, comprises: configuring, by a host, a same voting time, a same vote counting time, and a same leader node tenure for all nodes; and sending time configuration information that includes the same configured voting time, the same vote counting time, and the same leader node tenure to all the nodes, the nodes operable to vote during the same voting time, count the number of votes during the same vote counting time, and elect a leader node according to a vote counting result, wherein the nodes are enabled to perform periodic node election according to the same leader node tenure.

The foregoing and other described implementations can each, optionally, include one or more of the following features:

A first feature, combinable with any of the following features, the computer-implemented method further comprises: when there is no leader node among all nodes, sending, by at least one node, a voting request to all the nodes during a voting time that is included in time configuration information; receiving, by each node, vote information that is generated by other nodes according to the voting request; counting, by each node in a vote counting time that is included in the time configuration information, the number of votes included in the received vote information; and determining, by the nodes, a leader node according to the counted respective number of votes included in the vote information, to process a specified service.

A second feature, combinable with any of the previous or following features, further comprising terminating the receiving of the vote information before starting the counting.

A third feature, combinable with any of the previous or following features, further comprising determining, by the nodes, a leader node according to the counted respective number of votes included in the vote information includes: determining, by the node, the node itself as a leader node when the node judges that the counted number of votes included in the vote information exceeds a preset threshold, wherein the threshold is one-half of the number of all the nodes.

A fourth feature, combinable with any of the previous or following features, further comprising: when there is no leader node among all nodes, receiving, by at least two nodes as voting nodes during a voting time that is included in time configuration information, a voting request sent by a node; and generating, by the voting nodes according to the voting request, vote information, and sending the vote information to the node during the voting time, so that the node counts the number of votes included in the vote information in a vote counting time to determine a leader node.

A fifth feature, combinable with any of the previous or following features, wherein generating the vote information and sending the vote information to the node includes: determining, by the voting node, node information included in the received voting request; determining a priority of the node according to the node information; and selecting a node with a maximum priority, generating vote information for the node, and sending the vote information to the selected node.

A sixth feature, combinable with any of the previous or following features, further comprising: when there is a leader node among all nodes and the leader node determines that the leader node itself meets a preset criteria, sending, by the leader node, a reappointment request to all the nodes during a voting time according to a leader node tenure in the time configuration information; receiving, by the leader node, vote information generated by other nodes according to the reappointment request; counting, by the leader node in a vote counting time, the number of votes included in the received vote information; and determining, by the leader node, a reappointment state according to the counted number of votes included in the vote information, and processing a specified service after reappointment succeeds, wherein the preset criteria comprises at least one of a load processing criterion and a data updating degree.

A seventh feature, combinable with any of the previous or following features, further comprising: when there is a leader node among all nodes and the leader node determines that the leader node itself does not meet a preset criteria, screening out, by the leader node according to a leader node tenure in time configuration information, a node that meets the preset criteria among other nodes to serve as a successor node; and sending, by the leader node, a voting request for the successor node to other nodes during the voting period, so that the successor node receives vote information sent by other nodes, counts the number of votes included in the vote information in a vote counting time, and is determined as a new leader node.

An eighth feature, combinable with any of the previous or following features, further comprising: when there is a leader node among all nodes, receiving, by at least two nodes as voting nodes during a voting time included in time configuration information, a reappointment request sent by the leader node; and generating, by the voting nodes according to the reappointment request, vote information, and sending the vote information to the leader node in the voting time included in the time configuration information, so that the leader node counts the number of votes included in the vote information in a vote counting time, to determine a reappointment state, wherein the voting nodes only receive the voting request of the leader node in a tenure of the leader node.

A ninth feature, combinable with any of the previous or following features, further comprising: when there is a leader node among all nodes, receiving, by at least two nodes as voting nodes during a voting time included in time configuration information, a voting request for a successor node sent by the leader node; and generating, by the voting nodes according to the voting request, vote information, and sending the vote information to the successor node during the voting time included in the time configuration information, so that the successor node counts the number of votes included in the vote information during a vote counting time to determine a new leader node.

In a second implementation, a non-transitory, computer-readable medium stores one or more instructions executable by a computer system to perform operations comprising: configuring, by a host, a same voting time, a same vote counting time, and a same leader node tenure for all nodes; and sending time configuration information that includes the same configured voting time, the same vote counting time, and the same leader node tenure to all the nodes, the nodes operable to vote during the same voting time, count the number of votes during the same vote counting time, and elect a leader node according to a vote counting result, wherein the nodes are enabled to perform periodic node election according to the same leader node tenure.

The foregoing and other described implementations can each, optionally, include one or more of the following features:

A first feature, combinable with any of the following features, further comprising: when there is no leader node among all nodes, sending, by at least one node, a voting request to all the nodes during a voting time that is included in time configuration information; receiving, by each node, vote information that is generated by other nodes according to the voting request; counting, by each node in a vote counting time that is included in the time configuration information, the number of votes included in the received vote information; and determining, by the nodes, a leader node according to the counted respective number of votes included in the vote information, to process a specified service.

A second feature, combinable with any of the previous or following features, further comprising terminating the receiving of the vote information before starting the counting.

A third feature, combinable with any of the previous or following features, further compriseing determining, by the nodes, a leader node according to the counted respective number of votes included in the vote information includes determining, by the node, the node itself as a leader node when the node judges that the counted number of votes included in the vote information exceeds a preset threshold, wherein the threshold is one-half of the number of all the nodes.

A fourth feature, combinable with any of the previous or following features, further comprising: when there is no leader node among all nodes, receiving, by at least two nodes as voting nodes during a voting time that is included in time configuration information, a voting request sent by a node; and generating, by the voting nodes according to the voting request, vote information, and sending the vote information to the node during the voting time, so that the node counts the number of votes included in the vote information in a vote counting time to determine a leader node.

In a third implementation, a computer-implemented system comprises: one or more computers; and one or more computer memory devices interoperably coupled with the one or more computers and having tangible, non-transitory, machine-readable media storing instructions, that when executed by the one or more computers, perform operations using methods comprising: configuring, by a host, a same voting time, a same vote counting time, and a same leader node tenure for all nodes; and sending time configuration information that includes the same configured voting time, the same vote counting time, and the same leader node tenure to all the nodes, the nodes operable to vote during the same voting time, count the number of votes during the same vote counting time, and elect a leader node according to a vote counting result, wherein the nodes are enabled to perform periodic node election according to the same leader node tenure.

The foregoing and other described implementations can each, optionally, include one or more of the following features:

A first feature, combinable with any of the following features, further comprising: when there is no leader node among all nodes, sending, by at least one node, a voting request to all the nodes during a voting time that is included in time configuration information; receiving, by each node, vote information that is generated by other nodes according to the voting request; counting, by each node in a vote counting time that is included in the time configuration information, the number of votes included in the received vote information; and determining, by the nodes, a leader node according to the counted respective number of votes included in the vote information, to process a specified service.

A second feature, combinable with any of the previous or following features, further comprising terminating the receiving of the vote information before starting the counting.

A third feature, combinable with any of the previous or following features, further comprising determining, by the nodes, a leader node according to the counted respective number of votes included in the vote information includes: determining, by the node, the node itself as a leader node when the node judges that the counted number of votes included in the vote information exceeds a preset threshold, wherein the threshold is one-half of the number of all the nodes.

A fourth feature, combinable with any of the previous or following features, further comprising: when there is no leader node among all nodes, receiving, by at least two nodes as voting nodes during a voting time that is included in time configuration information, a voting request sent by a node; and generating, by the voting nodes according to the voting request, vote information, and sending the vote information to the node during the voting time, so that the node counts the number of votes included in the vote information in a vote counting time to determine a leader node.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or another unit for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures may be illustrated as individual modules that implement described features and functionality using various objects, methods, or other processes, the programs can instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/-R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a device that is used by the user (for example, by sending web pages to a web browser on a user's client device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    configuring, by a host, a same voting time, a same vote counting time, and a same leader node tenure for all nodes; and
    sending time configuration information that includes the same configured voting time, the same vote counting time, and the same leader node tenure to all the nodes, the nodes operable to vote during the same voting time, count the number of votes during the same vote counting time, and elect a leader node according to a vote counting result, wherein the nodes are enabled to perform periodic node election according to the same leader node tenure.

2. The computer-implemented method of claim 1, further comprising:
    when there is no leader node among all nodes, sending, by at least one node, a voting request to all the nodes during a voting time that is included in time configuration information;
    receiving, by each node, vote information that is generated by other nodes according to the voting request;
    counting, by each node in a vote counting time that is included in the time configuration information, the number of votes included in the received vote information; and
    determining, by the nodes, a leader node according to the counted respective number of votes included in the vote information, to process a specified service.

3. The computer-implemented method of claim 2, further comprising terminating the receiving of the vote information before starting the counting.

4. The computer-implemented method of claim 2, wherein determining, by the nodes, a leader node according to the counted respective number of votes included in the vote information includes determining, by the node, the node itself as a leader node when the node judges that the counted number of votes included in the vote information exceeds a preset threshold, wherein the threshold is one-half of the number of all the nodes.

5. The computer-implemented method of claim 1, further comprising:
    when there is no leader node among all nodes, receiving, by at least two nodes as voting nodes during a voting time that is included in time configuration information, a voting request sent by a node; and
    generating, by the voting nodes according to the voting request, vote information, and sending the vote information to the node during the voting time, so that the node counts the number of votes included in the vote information in a vote counting time to determine a leader node.

6. The computer-implemented method of claim 5, wherein generating the vote information and sending the vote information to the node includes:
    determining, by the voting node, node information included in the received voting request;
    determining a priority of the node according to the node information; and
    selecting a node with a maximum priority, generating vote information for the node, and sending the vote information to the selected node.

7. The computer-implemented method of claim 1, further comprising:
    when there is a leader node among all nodes and the leader node determines that the leader node itself meets a preset criteria, sending, by the leader node, a reappointment request to all the nodes during a voting time according to a leader node tenure in the time configuration information;
    receiving, by the leader node, vote information generated by other nodes according to the reappointment request;
    counting, by the leader node in a vote counting time, the number of votes included in the received vote information; and
    determining, by the leader node, a reappointment state according to the counted number of votes included in the vote information, and processing a specified service after reappointment succeeds, wherein the preset criteria comprises at least one of a load processing criterion and a data updating degree.

8. The computer-implemented method of claim 1, further comprising:
    when there is a leader node among all nodes and the leader node determines that the leader node itself does not meet a preset criteria, screening out, by the leader node according to a leader node tenure in time configuration information, a node that meets the preset criteria among other nodes to serve as a successor node; and
    sending, by the leader node, a voting request for the successor node to other nodes during the voting period, so that the successor node receives vote information sent by other nodes, counts the number of votes included in the vote information in a vote counting time, and is determined as a new leader node.

9. The computer-implemented method of claim 1, further comprising:
when there is a leader node among all nodes, receiving, by at least two nodes as voting nodes during a voting time included in time configuration information, a reappointment request sent by the leader node; and
generating, by the voting nodes according to the reappointment request, vote information, and sending the vote information to the leader node in the voting time included in the time configuration information, so that the leader node counts the number of votes included in the vote information in a vote counting time, to determine a reappointment state;
wherein the voting nodes only receive the voting request of the leader node in a tenure of the leader node.

10. The computer-implemented method of claim 1, further comprising:
when there is a leader node among all nodes, receiving, by at least two nodes as voting nodes during a voting time included in time configuration information, a voting request for a successor node sent by the leader node; and
generating, by the voting nodes according to the voting request, vote information, and sending the vote information to the successor node during the voting time included in the time configuration information, so that the successor node counts the number of votes included in the vote information during a vote counting time to determine a new leader node.

11. A non-transitory, computer-readable medium storing one or more instructions executable by a computer system to perform operations comprising:
configuring, by a host, a same voting time, a same vote counting time, and a same leader node tenure for all nodes; and
sending time configuration information that includes the same configured voting time, the same vote counting time, and the same leader node tenure to all the nodes, the nodes operable to vote during the same voting time, count the number of votes during the same vote counting time, and elect a leader node according to a vote counting result, wherein the nodes are enabled to perform periodic node election according to the same leader node tenure.

12. The non-transitory, computer-readable medium of claim 11, the operations further comprising:
when there is no leader node among all nodes, sending, by at least one node, a voting request to all the nodes during a voting time that is included in time configuration information;
receiving, by each node, vote information that is generated by other nodes according to the voting request;
counting, by each node in a vote counting time that is included in the time configuration information, the number of votes included in the received vote information; and
determining, by the nodes, a leader node according to the counted respective number of votes included in the vote information, to process a specified service.

13. The non-transitory, computer-readable medium of claim 12, the operations further comprising terminating the receiving of the vote information before starting the counting.

14. The non-transitory, computer-readable medium of claim 12, wherein determining, by the nodes, a leader node according to the counted respective number of votes included in the vote information includes determining, by the node, the node itself as a leader node when the node judges that the counted number of votes included in the vote information exceeds a preset threshold, wherein the threshold is one-half of the number of all the nodes.

15. The non-transitory, computer-readable medium of claim 11, the operations further comprising:
when there is no leader node among all nodes, receiving, by at least two nodes as voting nodes during a voting time that is included in time configuration information, a voting request sent by a node; and
generating, by the voting nodes according to the voting request, vote information, and sending the vote information to the node during the voting time, so that the node counts the number of votes included in the vote information in a vote counting time to determine a leader node.

16. A computer-implemented system, comprising:
one or more computers; and
one or more computer memory devices interoperably coupled with the one or more computers and having tangible, non-transitory, machine-readable media storing instructions, that when executed by the one or more computers, perform operations using methods comprising:
configuring, by a host, a same voting time, a same vote counting time, and a same leader node tenure for all nodes; and
sending time configuration information that includes the same configured voting time, the same vote counting time, and the same leader node tenure to all the nodes, the nodes operable to vote during the same voting time, count the number of votes during the same vote counting time, and elect a leader node according to a vote counting result, wherein the nodes are enabled to perform periodic node election according to the same leader node tenure.

17. The computer-implemented system of claim 16, the operations further comprising:
when there is no leader node among all nodes, sending, by at least one node, a voting request to all the nodes during a voting time that is included in time configuration information;
receiving, by each node, vote information that is generated by other nodes according to the voting request;
counting, by each node in a vote counting time that is included in the time configuration information, the number of votes included in the received vote information; and
determining, by the nodes, a leader node according to the counted respective number of votes included in the vote information, to process a specified service.

18. The computer-implemented system of claim 17, the operations further comprising terminating the receiving of the vote information before starting the counting.

19. The computer-implemented system of claim 17, wherein determining, by the nodes, a leader node according to the counted respective number of votes included in the vote information includes determining, by the node, the node itself as a leader node when the node judges that the counted number of votes included in the vote information exceeds a preset threshold, wherein the threshold is one-half of the number of all the nodes.

20. The computer-implemented system of claim 16, the operations further comprising:
when there is no leader node among all nodes, receiving, by at least two nodes as voting nodes during a voting time that is included in time configuration information, a voting request sent by a node; and generating, by the voting nodes according to the voting request, vote information, and sending the vote information to the node during the voting time, so that the node counts the number of votes included in the vote information in a vote counting time to determine a leader node.

* * * * *